United States Patent
Madsen et al.

(10) Patent No.: US 6,634,303 B1
(45) Date of Patent: Oct. 21, 2003

(54) LOCOMOTIVE WHEEL SLIP CONTROL AND METHOD

(75) Inventors: John Ernst Madsen, Lemont, IL (US); John Franklin Kral, Naperville, IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/167,032

(22) Filed: Jun. 11, 2002

(51) Int. Cl.[7] ............................................... B61C 11/00
(52) U.S. Cl. .......................................................... 105/73
(58) Field of Search ............................... 291/2, 22, 23; 105/34.1, 73; 180/197

(56) References Cited

U.S. PATENT DOCUMENTS 2,735,090 A * 2/1956 Maenpaa ................. 246/168.1
3,093,399 A * 6/1963 Smith ............................ 291/2
4,719,861 A * 1/1988 Savage et al. ............... 104/165

* cited by examiner

Primary Examiner—S. Joseph Morano
Assistant Examiner—Robert J. McCarry, Jr.
(74) Attorney, Agent, or Firm—Cary W. Brooks

(57) ABSTRACT

A wheel slip control for DC series wound traction motor vehicles such as railway locomotives in which each traction motor drives an axle and connected wheel set. The control utilizes motor field shunting, also known as field weakening, for providing wheel slip control. Each traction motor has its field shunted by a small percentage, such as 10%, during normal motoring operation. In the event that slipping of a wheel set is sensed by the control system, the motor powering the slipping wheel set is controlled by opening the shunting circuit, causing the motor's armature current and power to be dramatically reduced, thus stopping the wheel slip and allowing the shunting of the fields to be reapplied. This permits the continuous application of a higher aggregate amount of power over previous wheel slip correction methods and apparatus.

7 Claims, 1 Drawing Sheet

LOCOMOTIVE WHEEL SLIP CONTROL AND METHOD

TECHNICAL FIELD

This invention relates to vehicle wheel slip control and more particularly to control of wheel slip for electric motor-driven vehicles such as diesel locomotives.

BACKGROUND OF THE INVENTION

Diesel-powered railroad road locomotives generally utilize an electrical power transmission system involving a diesel engine-driven generator connected with a plurality of series wound traction motors each driving a powered axle supported by and driving a pair of rail-engaging wheels. A current system utilizes DC traction motors with a control system that constantly seeks to maximize the power delivered to the traction motors, within the power capability of the engine, by adjusting the field current of the main generator. In cases where wheel to rail adhesion is marginal, a wheel set may begin to slip. A wheel slip control detects this slip and promptly reduces main generator excitation, reducing output power to stop the slip, after which power is reapplied. A result of this method of operation is that power is reduced to all the traction motors powered by the generator even though only one wheel set may be slipping.

By contrast, locomotives may be provided with AC traction motors that operate with several induction motors fed from a variable frequency, variable voltage inverter. This control system has two advantages over the DC traction motor system previously described. First, in the event of a wheel slip, the motor speed can increase only a few percent until the rotation frequency of the motor approaches the inverter supply frequency. Prevention of a large speed increase during wheel slip is inherent, requiring no constant monitoring of wheel speeds as in the DC traction motor system. Also, the power supply to a slipping motor is inherently reduced by a much greater amount per unit of wheel slip than in the DC traction motor system. Second, during wheel slip, the power to non-slipping motors does not have to be reduced. They can continue to operate normally. Because of these advantages, AC traction motor locomotives can reliably operate at higher percent adhesion, that is, closer to the point of wheel slip, than DC traction motor locomotives as described above.

There are, however, other control schemes whereby DC traction motor locomotives can operate at higher percent adhesion comparable to, and perhaps even better than, AC traction motor locomotives. One of these uses separately excited fields for the DC traction, motor locomotives. Separate excitation has been used on previous electric locomotives and was able to limit slipping wheel speed to a few percent over nominal speed and power to non-slipping motors was not reduced, much the same as with the AC traction motor locomotives.

However, separate excitation for each traction motor adds considerably more expense compared to common excitation. A better and more cost effective method of wheel slip control is accordingly desired.

SUMMARY OF THE INVENTION

The present invention provides an alternative wheel slip control for DC traction motor locomotives having series excitation. The alternative control involves motor field shunting, also known as field weakening, for providing wheel slip control. With this arrangement, each traction motor has its field shunted (bypassed through a parallel resistor) by some small percentage, such as 10%, during normal motoring operation. In the event that slipping of a wheel set is sensed by the control system, the motor powering the slipping wheel set is controlled by opening the shunting circuit, increasing the field current, and causing the motor's armature current and power to be dramatically reduced, thus stopping the wheel slip and allowing shunting of the motor field to be reapplied.

In the past, field shunting has sometimes been applied to all the traction motors connected to a generator in order to allow the locomotive to be operated at higher speeds without exceeding the voltage limits of the generator or traction motors. However, it is not believed that removal of field shunting has previously been applied for controlling wheel slip in locomotives, and particularly for controlling slipping of individual traction motor wheel sets without affecting the power delivered to other wheel sets in the locomotive.

These and other features and advantages of the invention will be more fully understood from the following description of certain specific embodiments of the invention taken together with the accompanying drawings.

DESCRIPTION OF THE PREFERRED EMBODIMENT

Figure 1:
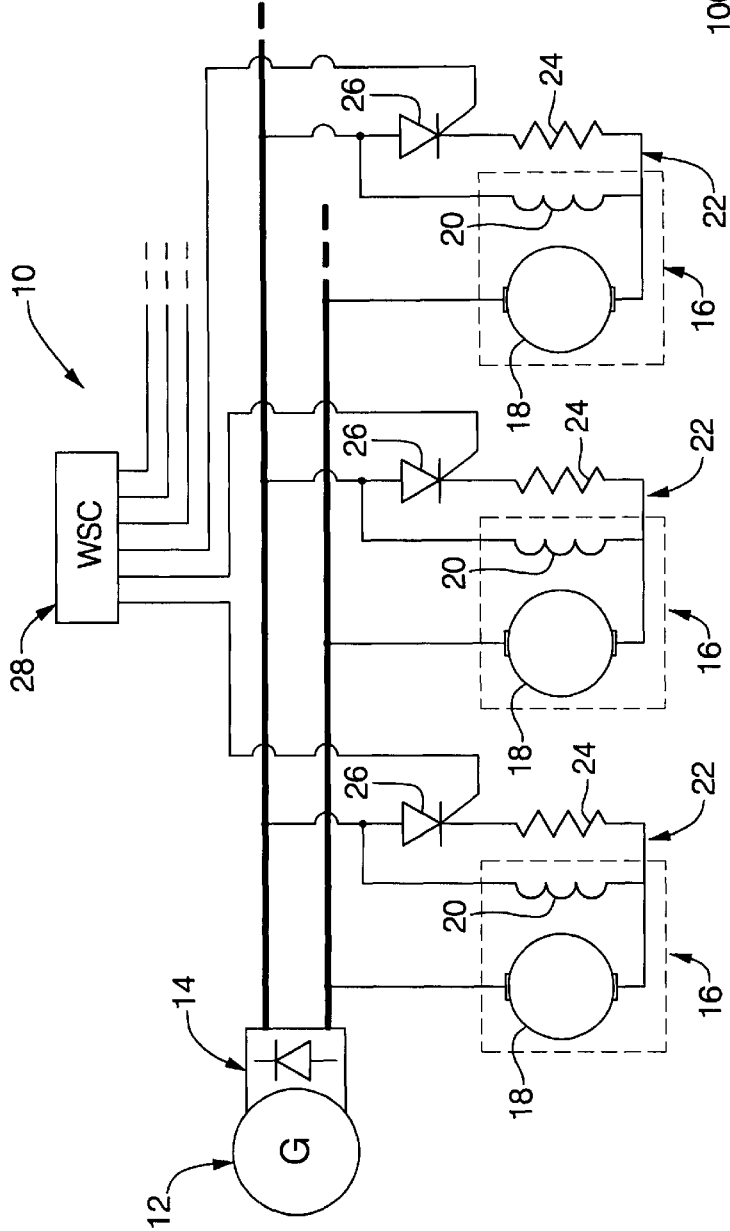
FIG. 1 is a schematic diagram showing major elements of a locomotive electrical power transmission system including wheel slip control according to the invention.

Referring first to FIG. 1 of the drawings, numeral 10 generally indicates the electrical power circuit for a locomotive power transmission apparatus according to the invention. Apparatus 10 includes a generator 12 which is optionally of the alternating current (AC) type having a separately excited field, not shown, and having its alternating current output connected directly with a rectifier 14. The rectifier converts the AC current to direct current (DC) and is connected with the several DC traction motors 16 of the locomotive through a parallel circuit in which the DC voltage supplied by the rectifier is applied to each of the traction motors separately.

Each traction motor includes an armature 18 and a field winding 20 which are connected in series. A shunting circuit 22 is connected around the field winding and includes a shunting resistor 24 and an electric switch 26. The switch may be in the form of an electrical contactor but could be a suitable electronic circuit including a thyristor or one or more gated transistors. The switches 26 for each of the traction motors 16 are connected individually with a wheel slip control 28 which monitors the speeds of the traction motor armatures 18 and is operative to open the switch 26 in the shunting circuit 22 of any traction motor in which the armature speed increases excessively, indicating that the wheel set driven by the traction motor is slipping.

In operation of the transmission apparatus, the separately excited generator 12 and the rectifier 14 provide power to the traction motors at a level controlled by generator excitation which may operate the traction motors near the maximum permissible torque under the adhesion conditions of the wheel to rail interface. This may be determined, for example, by an allowed percentage of wheel creep or speed differential between the speed of wheel rotation and the relative speed of locomotive motion along the rail, which provides a measurement for controlling the excitation of the generator.

Figure 2:
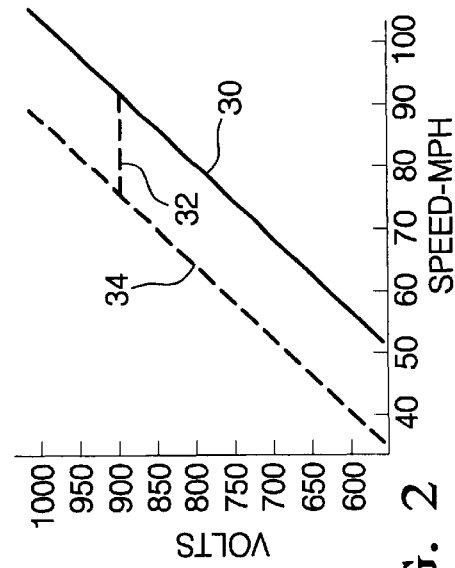
FIG. 2 is a diagram indicating the effect of shunting of the field in an individual motor to overcome slipping of a wheel set.

In normal operation, as shown in FIG. 2, the shunting circuit 22 for each of the motors is connected to bypass a small portion of the armature current around the traction motor field winding, allowing the traction motor to operate up to a desired maximum speed setting along an established speed-voltage curve 30. Should any one of the individual traction motors in the transmission apparatus encounter conditions causing that particular wheel set to slip at a greater speed on the rails, the wheel slip control 28, sensing the speed differential, is operative to open the switch 26 of the associated shunting circuit, cutting off the current bypass and sending full armature current through the field winding 20 of the motor.

The increased field current increases the back EMF generated by rotation of the armature, causing the current through the armature to decrease and resulting in an immediate reduction in the speed of the wheel set, as shown by the constant voltage line 32 of FIG. 2, to a lower speed on the unshunted speed-voltage curve 34 of FIG. 2. The armature speed reduction overcomes the wheel slip, returning the motor to a normal speed. The shunting circuit switch 26 is then reapplied and normal power is again delivered to the traction motor.

The control of wheel slip is thus provided individually for each traction motor by the opening of a shunting circuit switch and cutting off of field shunting to the traction motor of the slipping wheel set. The result is a greatly simplified wheel slip control apparatus which may be provided for controlling wheel slip in DC traction motor locomotives at relatively reasonable expense.

Although described in reference to a preferred application in diesel railway locomotives, certain aspects of the present invention may also be applied as appropriate in other electrically-powered wheeled vehicles driven by series wound DC traction motors. Also, if desired, the amount of field shunting may be made variable for additional control of wheel slip or for other purposes in various applications. This could be done in any suitable manner, such as, for example, by using multiple resistors or variable resistors in a circuit. Accordingly, the following claims should be construed to include such applications where not clearly excluded.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. Apparatus for wheel slip control of a vehicle having a DC power source electrically connected to a plurality of DC traction motors, each having a field winding and an armature connected in series, the armature being mechanically connected for directly driving at least one drive wheel of the vehicle, the apparatus comprising:

a shunting resistor connectable in a shunting circuit in parallel with the field winding of each of the traction motors;

a switch in each shunting circuit and openable to prevent shunt current flow through the resistor of the respective circuit; and a wheel slip control operative to detect excessive speed of any traction motor armature and associated wheel, indicating a wheel slip, and to open the switch, disconnecting the shunting resistor and decreasing current through the associated armature, thereby reducing the armature speed to stop the wheel slip.

2. Apparatus as in claim 1 wherein said vehicle is a diesel railway locomotive in which each traction motor drives an axle mounted on and driving a pair of wheels.

3. Apparatus as in claim 1 wherein the switch is an electrical contactor.

4. Apparatus as in claim 1 wherein the switch is one of a gated transistor and a thyristor.

5. Apparatus as in claim 1 wherein the DC power source is an engine-driven generator.

6. A method for controlling wheel slip in a vehicle having an engine driving a generator electrically connected to a plurality of DC traction motors, each having a field winding and an armature connected in series, the armature being mechanically connected for directly driving at least one drive wheel of the vehicle, the method comprising:

providing at least one shunting resistor connectable in a shunting circuit in parallel with the field winding of each of the traction motors;

providing a switch in each shunting circuit and openable to prevent shunt current flow through the resistor of the respective circuit; and providing a wheel slip control operative to detect excessive speed of any traction motor armature and associated wheel, indicating a wheel slip, and to open the switch, disconnecting the shunting resistor and decreasing current through the associated armature, thereby reducing the armature speed to stop the wheel slip.

7. A method as in claim 6 including varying the amount of shunting of the field current to vary the control of wheel slip.

* * * * *